United States Patent
Choi et al.

(10) Patent No.: US 12,539,866 B2
(45) Date of Patent: Feb. 3, 2026

(54) VEHICLE AND METHOD FOR LIMITING ACCELERATION THEREOF

(71) Applicants: Hyundai Motor Company, Seoul (KR); Kia Corporation, Seoul (KR)

(72) Inventors: Jeong Yoon Choi, Suwon-Si (KR); Seul Gi Lee, Hwaseong-Si (KR); Sung Bae Jeon, Hwaseong-Si (KR); Soo Bang Lee, Suwon-Si (KR); Hui Un Son, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/373,222

(22) Filed: Sep. 26, 2023

(65) Prior Publication Data

US 2024/0317246 A1 Sep. 26, 2024

(30) Foreign Application Priority Data

Mar. 20, 2023 (KR) ......................... 10-2023-0035992

(51) Int. Cl.
*B60W 50/038* (2012.01)
*B60W 10/06* (2006.01)
*B60W 30/188* (2012.01)

(52) U.S. Cl.
CPC .......... *B60W 50/038* (2013.01); *B60W 10/06* (2013.01); *B60W 30/188* (2013.01); *B60W 2720/106* (2013.01)

(58) Field of Classification Search
CPC .. B60W 50/038; B60W 10/06; B60W 30/188; B60W 2720/106; B60W 30/146; B60W 40/107; B60W 2520/10; B60W 2540/10
See application file for complete search history.

(56) References Cited

U.S. PATENT DOCUMENTS

| | | | |
|---|---|---|---|
| 8,392,090 B2 | 3/2013 | Okamura et al. | |
| 8,886,431 B2* | 11/2014 | Matsushita | F02D 11/02 701/110 |
| 2011/0022284 A1 | 1/2011 | Umakoshi et al. | |
| 2016/0368479 A1* | 12/2016 | Kim | B60W 10/06 |
| 2017/0101109 A1* | 4/2017 | Park | F16H 61/12 |

(Continued)

FOREIGN PATENT DOCUMENTS

| | | |
|---|---|---|
| JP | 2018-001962 | 1/2018 |
| JP | 2019-142491 | 8/2019 |

(Continued)

OTHER PUBLICATIONS

Machine Translation KR20200065116A PDF File Name: "KR20200065116A_Machine_Translation.pdf" (Year: 2020).*

*Primary Examiner* — Grant Moubry
*Assistant Examiner* — Ruben Picon-Feliciano
(74) *Attorney, Agent, or Firm* — MORGAN, LEWIS & BOCKIUS LLP

(57) ABSTRACT

A vehicle is configured for controlling an acceleration limit according to the change amount in the accelerator pedal, and a method for limiting the acceleration thereof. A method for limiting acceleration of a vehicle may include: activating an acceleration limitation function; and adjusting an acceleration limit of the vehicle based on a vehicle situation and a change in accelerator pedal manipulation (APS) of the vehicle.

14 Claims, 5 Drawing Sheets

(56) References Cited

U.S. PATENT DOCUMENTS

| | | | | |
|---|---|---|---|---|
| 2019/0366855 A1* | 12/2019 | Oh | .......................... | B60L 50/51 |
| 2019/0389317 A1* | 12/2019 | Oh | .......................... | B60L 15/20 |
| 2021/0354621 A1* | 11/2021 | Son | ........................ | B60Q 1/302 |
| 2022/0055604 A1* | 2/2022 | Cho | ........................ | B60L 50/16 |

FOREIGN PATENT DOCUMENTS

| | | | | |
|---|---|---|---|---|
| KR | 10-1899394 | | 9/2018 | |
| KR | 20200065116 A | * | 6/2020 | ............ B60W 10/10 |
| KR | 10-2367770 | | 2/2022 | |
| KR | 10-2022-0040102 | | 3/2022 | |

\* cited by examiner

VEHICLE AND METHOD FOR LIMITING ACCELERATION THEREOF

CROSS-REFERENCE TO RELATED APPLICATION(S)

The present application claims priority to Korean Patent Application No. 10-2023-00035992, filed on Mar. 20, 2023, the entire contents of which is incorporated herein for all purposes by this reference.

BACKGROUND OF THE PRESENT DISCLOSURE

Field of the Present Disclosure

The present disclosure relates to a vehicle capable of controlling an acceleration limit according to the change amount in the accelerator pedal, and a method for limiting the acceleration thereof.

Description of Related Art

A speed limitation device refers to a driving safety system for limiting the acceleration of the vehicle so that the driver does not increase the driving speed beyond a preset speed limit, preventing overspeeding. A typical example of the speed limitation device is a manual speed limit assist (MSLA) function.

In general, the MSLA function does not perform braking control for deceleration, meaning that the vehicle could be accelerated beyond the configured speed when moving downhill, for example, and does not consider the relative position/speed of the preceding vehicle, unlike smart cruise control (SCC), making it necessary for the driver to view the situation in front.

Recently, there have been development and application of functions such as camera-based SLA (CSLA) which utilizes speed limitation information recognized through a front camera, and intelligent SLA (ISLA) which further utilizes speed limitation information from a navigation system.

Such speed limitation devices are defined according to SAFETY ASSIST-SPEED ASSIST SYSTEM-SPEED CONTROL FUNCTION among assessment items of The European New vehicle Assessment Programme (EURO NCAP).

However, acceleration also needs be taken into account when providing the above-mentioned vehicle speed limitation function. According to a vehicle acceleration limitation scheme, the acceleration torque limit corresponding to the currently set acceleration limit may be assessed, and the driving source torque may be limited to the acceleration torque limit when the driver-required torque is greater than the same. However, such a scheme cannot reflect a change in the amount of manipulation of the accelerator pedal, causing a problem in that the vehicle undergoes pitching, depending on the vehicle speed or the gear stage, or cannot secure acceleration performance.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle configured for varying an acceleration limit in response to a change in the amount of manipulation of the accelerator pedal, and a method for limiting the acceleration thereof.

The technical subjects pursued in an exemplary embodiment of the present disclosure may not be limited to the above mentioned technical subjects, and other technical subjects which are not mentioned may be clearly understood, through the following descriptions, by those skilled in the art to which the present disclosure pertains.

A method for limiting acceleration of a vehicle according to various exemplary embodiments of the present disclosure may include: activating an acceleration limitation function; and adjusting an acceleration limit based on a vehicle situation and a change in accelerator pedal manipulation.

For example, the adjusting may include: assessing an amount of average change in the accelerator pedal manipulation; and adjusting the acceleration limit based on the assessed amount of average change in accelerator pedal manipulation.

For example, the assessing may include sampling a positive change amount in accelerator pedal manipulation without change thereof, and applying a predetermined factor to a negative change amount in accelerator pedal manipulation.

For example, the method for limiting acceleration of a vehicle may further include assessing a base torque limit, and the adjusting may include adjusting the base torque limit based on the change in accelerator pedal manipulation.

For example, the vehicle situation may include at least one of a current gear stage, a current speed, or a current torque of the vehicle.

For example, the adjusting may include: increasing the acceleration limit based on the change in accelerator pedal manipulation if the current gear stage is higher than a preset gear stage threshold; and decreasing the acceleration limit based on the change in accelerator pedal manipulation if the current gear stage is higher than the gear stage threshold.

Furthermore, a vehicle according to various exemplary embodiments of the present disclosure may include: an acceleration limit assessment device configured to adjust an acceleration limit based on a vehicle situation and a change in accelerator pedal manipulation (APS) in response to activation of an acceleration limitation function of the vehicle; and an acceleration limitation device configured to determine a driving source torque based on the adjusted acceleration limit.

For example, the acceleration limit assessment device may include: an accelerator pedal manipulation change assessment unit configured to assess the amount of average change in accelerator pedal manipulation; and an acceleration limit assessment unit configured to adjust the acceleration limit based on the assessed amount of average change in accelerator pedal manipulation.

For example, the accelerator pedal manipulation change assessment unit may be configured to sample a positive change amount in accelerator pedal manipulation without change and apply a predetermined factor to a negative change amount in accelerator pedal manipulation.

For example, the acceleration limit assessment device may be configured to assess a base torque limit and adjust the base torque limit based on the change in accelerator pedal manipulation.

For example, the vehicle situation may include at least one of a current gear stage, a current speed, or a current torque of the vehicle.

For example, the acceleration limit assessment device may be configured to increase the acceleration limit based on the change in accelerator pedal manipulation when the current gear stage is higher than a preset gear stage threshold, and decrease the acceleration limit based on the change in accelerator pedal manipulation when the current gear stage is higher than the gear stage threshold.

According to various exemplary embodiments of the present disclosure, a more effective acceleration limitation function may be provided.

the acceleration limit may be varied according to a change in the amount of manipulation of the accelerator pedal and the vehicle situation, alleviating the phenomenon of pitching or insufficient acceleration while the acceleration limitation function is provided.

Advantageous effects obtainable from the present disclosure may not be limited to the above mentioned effects, and other effects which are not mentioned may be clearly understood, through the following descriptions, by those skilled in the art to which the present disclosure pertains.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
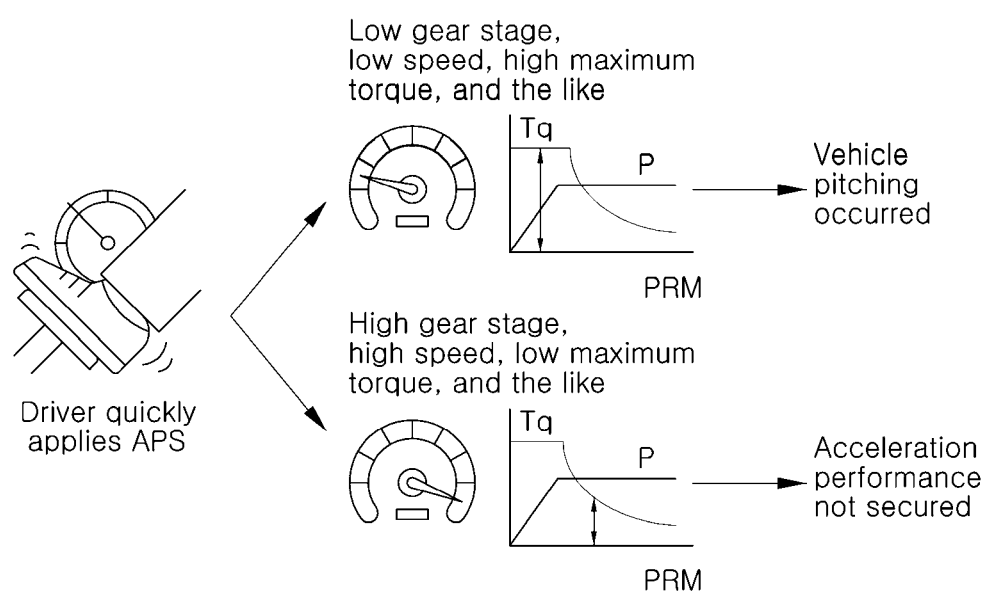
FIG. 1 illustrates problems during acceleration according to vehicle situations.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments included in the present specification will be described in detail with reference to the accompanying drawings, and the same or similar elements are provided the same and similar reference numerals, so duplicate descriptions thereof will be omitted. The terms "module" and "unit" used for the elements in the following description are provided or interchangeably used in consideration of only the ease of writing the specification, and do not have distinct meanings or roles by themselves. In describing the exemplary embodiments included in the present specification, when the detailed description of the relevant known technology is determined to unnecessarily obscure the gist of the present disclosure, the detailed description may be omitted. Furthermore, the accompanying drawings are provided only for easy understanding of the exemplary embodiments included in the present specification, and the technical spirit included herein is not limited to the accompanying drawings, and it should be understood that all changes, equivalents, or substitutes thereof are included in the spirit and scope of the present disclosure.

Terms including an ordinal number such as "first", "second", or the like may be used to describe various elements, but the elements are not limited to the terms. The above terms are used only for distinguishing one element from another element.

In the case where an element is referred to as being "connected" or "coupled" to any other element, it should be understood that another element may be provided therebetween, as well as that the element may be directly connected or coupled to the other element. In contrast, in the case where an element is "directly connected" or "directly coupled" to any other element, it should be understood that no other element is present therebetween.

A singular expression may include a plural expression unless they are definitely different in a context.

As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

A unit or a control unit included in names such as a motor control unit (MCU) and a hybrid control unit (HCU) is merely a term widely used for naming a controller configured to control a specific function of a vehicle, but does not mean a generic function unit. For example, each controller may include a communication device configured to communicate with a sensor or another control unit, a memory configured to store an operation system, a logic command, or input/output information, and at least one processor configured to perform determination, calculation, decision or the like which are required for responsible function controlling.

FIG. 1 illustrates problems during acceleration according to vehicle situations.

Referring to FIG. 1, when the driver rapidly manipulates the accelerator pedal, that is, when the accelerator pedal position sensor (APS) value abruptly increases, different results may occur according to the vehicle situation. For example, in a situation in which the gear stage is low, the vehicle speed is low (low-speed), or the maximum torque of the driving source (e.g., an engine, a driving motor) is high, the front portion of the vehicle may jump, and a pitching behavior may occur. On the other hand, in a situation in which the gear stage is high, the vehicle speed is high (high-speed), or the maximum torque of the driving source is relatively low, it is difficult to secure acceleration performance.

Therefore, various embodiments of the present disclosure propose that, in connection with applying an acceleration limitation function, the acceleration limit be varied in view of the change amount in the APS value. A vehicle configuration to the present end will be described with reference to FIG. 2.

Figure 2:
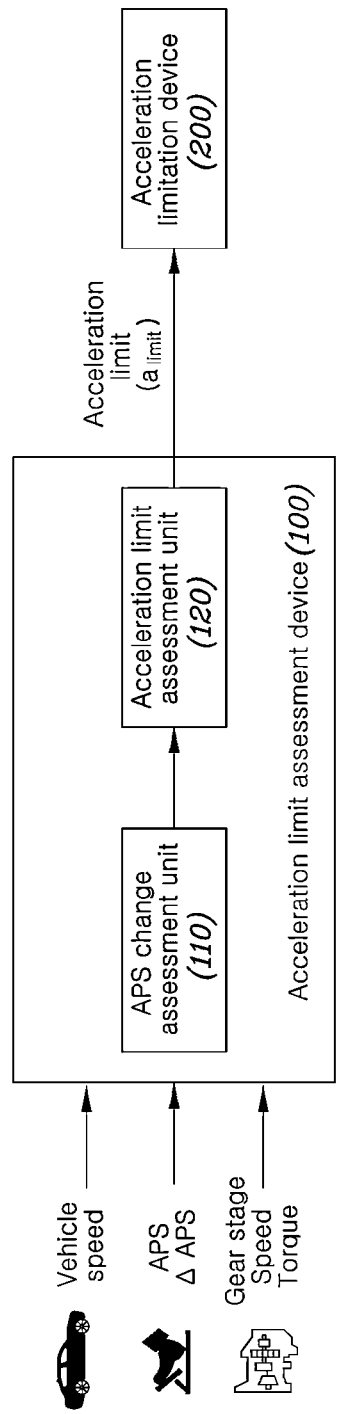
FIG. 2 illustrates an example of the configuration of a vehicle including an acceleration limitation function according to an exemplary embodiment of the present disclosure.

FIG. 2 illustrates an example of the configuration of a vehicle including an acceleration limitation function according to an exemplary embodiment of the present disclosure.

Referring to FIG. 2, the vehicle according to various exemplary embodiments of the present disclosure may include an acceleration limit assessment device 100 and an acceleration limitation device 200. FIG. 2 illustrates major components related to the exemplary embodiment of the present disclosure, and it is obvious that, when an actual vehicle is implemented, more components (for example, a driving source and the like) may be included.

The acceleration limit assessment device 100 may have, as input information, the vehicle speed, the amount of manipulation of the accelerator pedal (APS), the amount of change in the amount of manipulation of the accelerator pedal (ΔAPS), the gear stage, the speed (vehicle speed), torque information, and the like, and may include an acceleration limit ($a_{limit}$) output information. Furthermore, the acceleration limit assessment device 100 may include an APS change assessment unit 110 and an acceleration limit assessment unit 120.

The APS change assessment unit 110 may assess the amount of average change in the APS value applied by the driver. To the present end, the APS change assessment unit 110 may be configured to determine the average of a preset number of samples to prevent an abrupt change in the APS value. A loss factor (for example, a value between 0 and 1) may be applied to a negative change amount to correspond to APS chattering. More detailed operations of the APS change assessment unit 110 will be described later with reference to FIG. 3.

The acceleration limit assessment unit 120 may assess the acceleration limit according to the vehicle situation based on the amount of average change of the APS amount assessed by the APS change assessment unit 110. As used herein, the vehicle situation may refer to the current gear state, and at least one of speed and torque may be considered together with or instead of the current gear state, depending on the implementation.

In other words, the acceleration limit may be assessed by applying the APS value and/or the amount of average change of the APS value to the base acceleration limit so that the base acceleration limit is corrected, determining the acceleration limit.

For example, the base acceleration limit may be determined by the vehicle speed, and the base acceleration limit determined by the vehicle speed may be multiplied by a weight based on the APS value and a weight based on the ΔAPS value, determining the final acceleration limit ($a_{limit}$). However, this is an example, and the present disclosure is not necessarily limited thereto.

As an exemplary embodiment of the present disclosure, the base acceleration limit may be determined in view of at least one among the drive mode, an acceleration limit set by the driver, the road type, and road congestion. If the driver has manually set an acceleration limit, the same may become the base acceleration limit, and different acceleration limits may be applied as the base acceleration limit in an order of the drive mode trends (eco/comfort/sprots/and the like).

Correction of the base acceleration limit may include correction of a rapid increase in APS, and correction in a situation in which, after the rapid increase, the APS returns or converges to the previous amount of manipulation (that is, rapid decrease in APS).

For example, the acceleration limit may be increased to reduce the occurrence of vehicle pitching due to a rapid increase in APS, and the acceleration limit may be increased if it is difficult to secure acceleration performance even in a situation of rapid increase in APS. Furthermore, filtering may be applied to suppress an increase in acceleration limit to reduce the occurrence of re-acceleration after an APS return, and filtering may be applied to slow down a decrease in acceleration to maintain acceleration performance if it is difficult to secure acceleration performance after an APS return. Filtering may be applied in a rate limiter type in which the change rate is limited, or in a low-pass filter (LPF) type, but is this is an example, and the present disclosure is not necessarily limited thereto.

Detailed operations of the acceleration limit assessment unit 120 will be described later with reference to FIG. 4.

Meanwhile, the acceleration limitation device 200 may obtain limited acceleration ($a_{limit}$) information from the acceleration limit assessment device 100 and may assess a corrected torque by applying acceleration limitation to the driver-required torque. For example, the corrected torque may be assessed in the following manner: the driver-required toque and the maximum allowed torque based on acceleration limitation are compared, and if the driver-required toque is greater than the maximum allowed torque based on acceleration limitation, the maximum allowed torque based on acceleration limitation is output to a driving source control unit as a torque command. The driving source control unit may be, depending on the vehicle driving source, an engine management system (EMS), a motor control unit (MCU), a hybrid control unit (HCU), an integrated vehicle control unit (VCU), or the like, but is not necessarily limited thereto.

According to an exemplary embodiment of the present disclosure, the APS change assessment unit 110 and the acceleration limit assessment unit 120 of the acceleration limit assessment device 100 each may be a processor (e.g., computer, microprocessor, CPU, ASIC, circuitry, logic circuits, etc.). The acceleration limit assessment device 100 each may be a processor (e.g., computer, microprocessor, CPU, ASIC, circuitry, logic circuits, etc.). Alternatively, the APS change assessment unit 110 and an acceleration limit assessment unit 120 may be implemented as a single integrated semiconductor circuit.

The acceleration limitation device 200 may be implemented by a non-transitory memory storing, e.g., a program (s), software instructions reproducing algorithms, etc., which, when executed, controls operations of various components of the vehicle, and a processor configured to execute the program(s), software instructions reproducing algorithms, etc. Alternatively, the acceleration limit assessment device 100 and acceleration limitation device 200 may be implemented as a single integrated semiconductor circuit.

Herein, the memory and the processor may be implemented as separate semiconductor circuits. Alternatively, the memory and the processor may be implemented as a single integrated semiconductor circuit. According to some aspect of the present disclosure, the components 10, 20, 30, 40, 50, and 60 may embody one or more processor(s) each having associated non-transitory memory.

Figure 3:
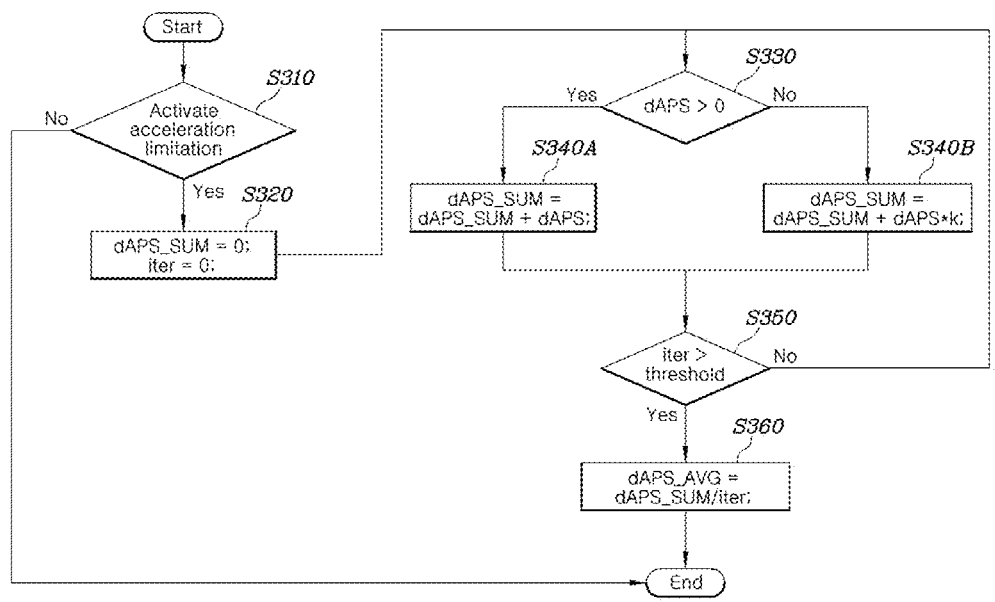
FIG. 3 is a flowchart illustrating an example of operations of an APS change assessment unit according to an exemplary embodiment of the present disclosure.

FIG. 3 is a flowchart illustrating an example of operations of the APS change assessment unit 110 according to an exemplary embodiment of the present disclosure.

Referring to FIG. 3, as an acceleration limitation function is activated (Yes in S310), the APS change assessment unit 110 may initialize the total amount of APS change (dAPS_SUM) and the number of sample repetitions (iter) (S320). Activation of the acceleration limitation function may be performed concurrently with a vehicle startup by a user menu setup or the like, may be performed by activation of a specific mode (for example, infant mode), or may be performed by the driver's menu selection or manipulation of a button or the like while driving.

If the amount of APS change that has been input after initialization is greater than 0 (Yes in S330), the amount of APS change (dAPS) may be added to the total amount with no change of the amount of APS change (dAPS) (S340A), and if not (No in S330), a predetermined loss factor (k) may be applied to the amount of APS change (dAPS), which may then be added to the total amount (dAPS_SUM) (S340B).

Determination of the total amount according to sampling of the amount of APS change (dAPS) may be repeatedly performed until the number of sample repetitions (iter) exceeds a preset threshold (S350).

If sampling that satisfies the threshold is performed, the total amount may be divided by the number of sample repetitions, obtaining the amount of average change in APS (dAPS_AVG) (S360).

Figure 4:
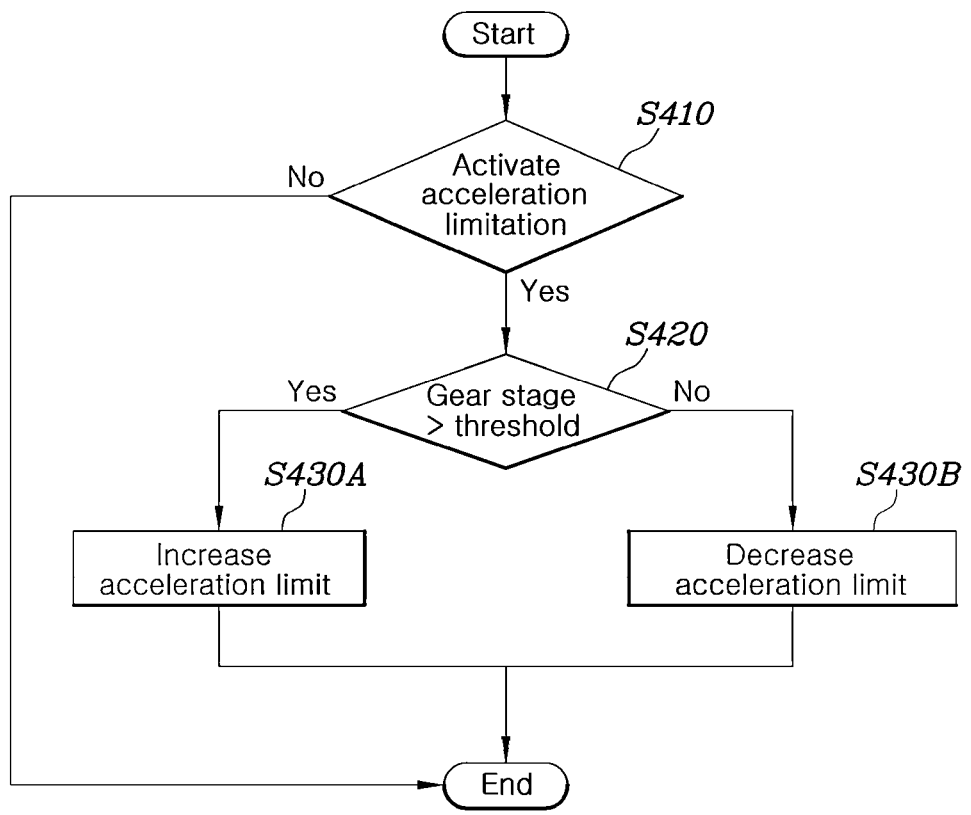
FIG. 4 is a flowchart illustrating an example of operations of an acceleration limit assessment unit according to an exemplary embodiment of the present disclosure.

FIG. 4 is a flowchart illustrating an example of operations of the acceleration limit assessment unit 120 according to an exemplary embodiment of the present disclosure. Illustration of base acceleration limit assessment is omitted in FIG. 4.

Referring to FIG. 4, as the acceleration limit assessment is activated (Yes in S410), the acceleration limit assessment unit 120 may be configured to determine whether the current gear stage is higher than a preset gear stage threshold (S420). The gear stage threshold may refer to a gear stage determined by test, depending on the vehicle, based on at least one of the possibility that pitching will occur if the base acceleration limit is applied without change thereof, and the possibility that acceleration performance will be unsatisfactory. However, this is an example, and the present disclosure is not necessarily limited thereto. Furthermore, the above-mentioned gear stage may be replaced with a different piece of information such as speed, driving torque, or wheel torque.

If the current gear stage is higher than the gear stage threshold (Yes in S420), meaning that unsatisfactory acceleration may occur, the acceleration limit may be determined to increase the base acceleration limit in view of the amount of average change in APS (S430A). On the other hand, if the current gear stage is lower than the preset gear stage threshold (No in S420), meaning that pitching may occur, the acceleration limit may be determined to decrease the base acceleration limit in view of the amount of average change in APS (S430B).

The adjusted base acceleration limit in S430A and S430B is applied to a speed limitation device of the vehicle for limiting the acceleration of the vehicle so that the driver does not increase the driving speed beyond a preset speed limit, preventing overspeeding.

Advantageous effects of the above-described acceleration limitation method will be described with reference to FIG. 5.

Figure 5:
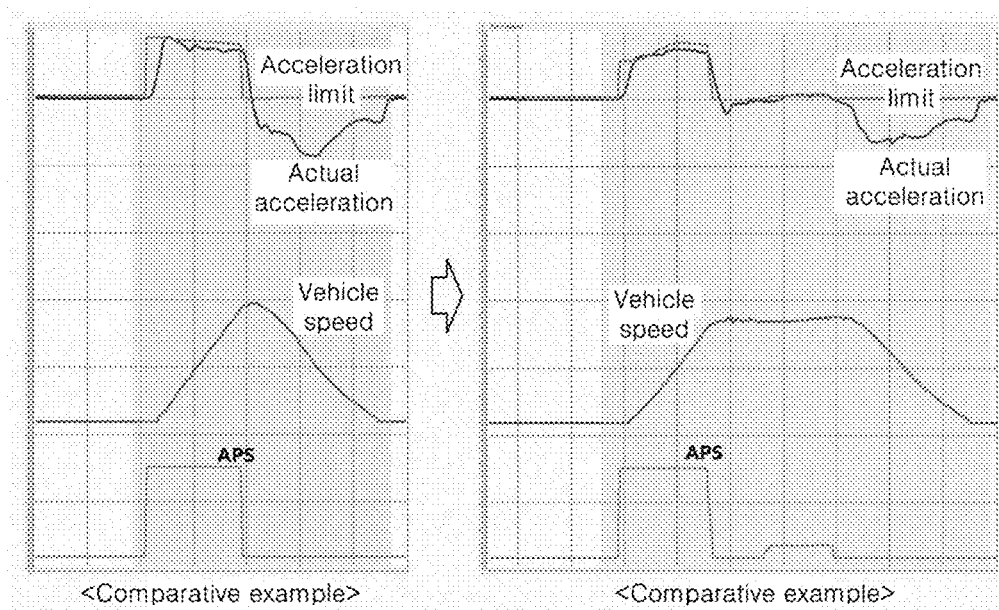
FIG. 5 illustrates advantageous effects of an acceleration limitation function according to an exemplary embodiment of the present disclosure.

FIG. 5 illustrates advantageous effects of the acceleration limitation function according to an exemplary embodiment of the present disclosure.

In FIG. 5, the left graph corresponds to an acceleration limitation scheme according to a comparative example, in which the base acceleration limit is not corrected, and the right graph corresponds to an acceleration limitation scheme according to an exemplary embodiment of the present disclosure, in which the base acceleration limit is corrected in view of the gear stage. In each graph, the vertical axis refers to acceleration, vehicle speed, and APS value in the downward order, and the horizontal axis refers to time in conjunction with the vertical axis.

In the situation of the comparative example, pitching may occur because the acceleration limit high in the early phase of acceleration because the vehicle speed and APS value are solely considered when the APS increases abruptly. On the other hand, it is clear from the exemplary embodiment that, although the vehicle speed is increased by application of a high APS value, the low gear stage corrects the base acceleration limit to be decreased, and the acceleration limit is relatively low in the early phase of acceleration. Therefore, in the acceleration limitation scheme according to an exemplary embodiment of the present disclosure, pitching may be reduced even in an abrupt acceleration situation.

The vehicle and the method for limiting acceleration thereof according to an exemplary embodiment described above may provide normal occupants with an improved ride feeling and excellent acceleration performance by reducing pitching. The vehicle behavior may be stabilized within the acceleration limitation function so that larger advantageous effects may be expected when infants who are sensitive to acceleration are aboard.

The present disclosure as described above may be implemented as codes in a computer-readable medium in which a program is recorded. The computer-readable medium includes all types of recording devices in which data readable by a computer system are stored. Examples of the computer-readable medium include a Hard Disk Drive (HDD), a solid state disk (SSD), a silicon disk drive (SDD), a ROM, a RAM, a CD-ROM, a magnetic tape, a floppy disk, an optical data storage device, and the like. Furthermore, the above detailed description should not be construed in a limitative sense, but should be considered in an illustrative sense in all aspects. The scope of the present disclosure should not be determined by reasonable interpretation of the appended claims, and all changes and modifications within the equivalent scope of the present disclosure fall within the scope of the present disclosure.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method for limiting acceleration of a vehicle, the method comprising:
   receiving, by a processor, an acceleration limitation function; and
   adjusting, by the processor, an acceleration limit of the vehicle based on a vehicle situation and a change in accelerator pedal manipulation (APS) of the vehicle;
   determine a driving source torque based on the adjusted acceleration limits;
   wherein the adjusting includes:
      assessing, by the processor, an amount of average change in the accelerator pedal manipulation; and
      adjusting, by the processor, the acceleration limit based on the assessed amount of average change in the accelerator pedal manipulation;
   further including: assessing a corrected torque by applying the acceleration limit to a driver-required torque;
   wherein the assessing of the corrected torque by applying the acceleration limit to the driver-required torque includes: comparing the driver-required toque and a maximum allowed torque based on the acceleration limit; and outputting the maximum allowed torque to a driving source control unit as a torque command of a driving source when the driver-required toque is greater than the maximum allowed torque.

2. The method of claim 1, wherein the assessing includes sampling a positive change amount in the accelerator pedal manipulation without change thereof.

3. The method of claim 1, wherein the assessing includes sampling a negative change amount in the accelerator pedal manipulation, and applying a predetermined factor to the negative change amount in the accelerator pedal manipulation.

4. The method of claim 1, further including assessing a base torque limit, wherein the adjusting of the acceleration limit of the vehicle based on the vehicle situation and the change in the accelerator pedal manipulation (APS) of the vehicle includes adjusting the base torque limit based on the change in the accelerator pedal manipulation.

5. The method of claim 1, wherein the vehicle situation includes at least one of a current gear stage, a current speed, or a current torque of the vehicle.

6. The method of claim 5, wherein the adjusting of the acceleration limit of the vehicle based on the vehicle situation and the change in the accelerator pedal manipulation (APS) of the vehicle includes:
increasing the acceleration limit based on the change in the accelerator pedal manipulation when the current gear stage is higher than a preset gear stage threshold; and
decreasing the acceleration limit based on the change in the accelerator pedal manipulation when the current gear stage is lower than the preset gear stage threshold.

7. A non-transitory computer-readable recording medium in which a program for executing the method for limiting acceleration of the vehicle of claim 1 is recorded.

8. A vehicle comprising:
an acceleration limit assessment device configured to adjust an acceleration limit based on a vehicle situation and a change in accelerator pedal manipulation (APS) in response to activation of an acceleration limitation function of the vehicle; and
an acceleration limitation device configured to:
determine a driving source torque based on the adjusted acceleration limits;
wherein the acceleration limit assessment device includes:
an accelerator pedal manipulation change assessment unit configured to assess an amount of average change in the accelerator pedal manipulation; and
an acceleration limit assessment unit configured to adjust the acceleration limit based on the assessed amount of average change in the accelerator pedal manipulation;
wherein the acceleration limitation device is further configured to assess a corrected torque by applying the acceleration limit to a driver-required torque;
wherein in the assessing of the corrected torque by applying the acceleration limit to the driver-required torque, and the acceleration limitation device is further configured for: comparing the driver-required toque and a maximum allowed torque based on the acceleration limit; and outputting the maximum allowed torque to a driving source control unit as a torque command of a driving source when the driver-required toque is greater than the maximum allowed torque.

9. The vehicle of claim 8, wherein the accelerator pedal manipulation change assessment unit is further configured to sample a positive change amount in the accelerator pedal manipulation without change thereof.

10. The vehicle of claim 8, wherein the accelerator pedal manipulation change assessment unit is further configured to sample a negative change amount in the accelerator pedal manipulation and apply a predetermined factor to the negative change amount in the accelerator pedal manipulation.

11. The vehicle of claim 8, wherein the acceleration limit assessment device is further configured to assess a base torque limit and adjust the base torque limit based on the change in the accelerator pedal manipulation.

12. The vehicle of claim 11, wherein the acceleration limit assessment device is further configured to increase the acceleration limit based on the change in the accelerator pedal manipulation when the current gear stage is higher than a preset gear stage threshold, and decrease the acceleration limit based on the change in the accelerator pedal manipulation when the current gear stage is lower than the preset gear stage threshold.

13. The vehicle of claim 8, wherein the vehicle situation includes at least one of a current gear stage, a current speed, or a current torque of the vehicle.

14. A method for limiting acceleration of a vehicle, the method comprising:
receiving, by a processor, an acceleration limitation function;
adjusting, by the processor, an acceleration limit of the vehicle based on a vehicle situation and a change in accelerator pedal manipulation (APS) of the vehicle; and
determine a driving source torque based on the adjusted acceleration limit;
wherein the adjusting includes:
assessing, by the processor, an amount of average change in the accelerator pedal manipulation; and
adjusting, by the processor, the acceleration limit based on the assessed amount of average change in the accelerator pedal manipulation,
wherein the vehicle situation includes at least one of a current gear stage, a current speed, or a current torque of the vehicle, and
wherein the adjusting of the acceleration limit of the vehicle based on the vehicle situation and the change in the accelerator pedal manipulation (APS) of the vehicle includes:
increasing the acceleration limit based on the change in the accelerator pedal manipulation when the current gear stage is higher than a preset gear stage threshold; and
decreasing the acceleration limit based on the change in the accelerator pedal manipulation when the current gear stage is lower than the preset gear stage threshold.

* * * * *